United States Patent
Kuroda

[19]
[11] Patent Number: 6,124,752
[45] Date of Patent: Sep. 26, 2000

[54] SEMICONDUCTOR INTEGRATED CIRCUIT DEVICE CONTROLLING THE THRESHOLD VALUE THEREOF FOR POWER REDUCTION AT STANDBY MODE

[75] Inventor: Tadahiro Kuroda, Yokohama, Japan

[73] Assignee: Kabushiki Kaisha Toshiba, Kawasaki, Japan

[21] Appl. No.: 08/825,272

[22] Filed: Mar. 27, 1997

[30] Foreign Application Priority Data

Apr. 2, 1996 [JP] Japan .................................. 8-080122
Feb. 7, 1997 [JP] Japan .................................. 9-025413

[51] Int. Cl.⁷ .................................................. H01L 27/04
[52] U.S. Cl. ........................................ 327/534; 327/537
[58] Field of Search ................................ 327/530, 534, 327/535, 537, 538, 539

[56] References Cited

U.S. PATENT DOCUMENTS

| | | | |
|---|---|---|---|
| 4,961,007 | 10/1990 | Kumanoya et al. | 327/534 |
| 5,057,704 | 10/1991 | Koyanagi et al. | 327/534 |
| 5,280,455 | 1/1994 | Kanaishi | 365/229 |
| 5,461,338 | 10/1995 | Hirayama et al. | 327/534 |
| 5,557,231 | 9/1996 | Yamaguchi et al. | 327/534 |
| 5,703,522 | 12/1997 | Arimoto et al. | 327/534 |

FOREIGN PATENT DOCUMENTS

| | | |
|---|---|---|
| 8403185 | 8/1984 | European Pat. Off. . |
| 0469587 | 2/1992 | European Pat. Off. . |
| 3-82151 | 4/1991 | Japan . |
| 5-108194 | 4/1993 | Japan . |
| 10-187270 | 7/1998 | Japan . |
| 10-189883 | 7/1998 | Japan . |
| 10-189884 | 7/1998 | Japan . |

*Primary Examiner*—Timothy P. Callahan
*Assistant Examiner*—Eunja Adolphe
*Attorney, Agent, or Firm*—Loeb & Loeb, LLP

[57] ABSTRACT

The disclosed semiconductor integrated circuit device can control the threshold thereof without adding any other supply voltages except a drive supply voltage and a ground supply voltage. The semiconductor integrated circuit device comprises: a substrate potential generating circuit operative on the basis of a control signal, for deepening a substrate bias by pumping out charges from a semiconductor substrate when activated, but for setting an output thereof to a high impedance when deactivated; and a switch circuit operative on the basis of the control signal and turned on when the substrate potential generating circuit is deactivated, to set potential of the semiconductor substrate to a supply potential, but turned off when the substrate potential generating circuit is activated.

28 Claims, 13 Drawing Sheets

SEMICONDUCTOR INTEGRATED CIRCUIT DEVICE CONTROLLING THE THRESHOLD VALUE THEREOF FOR POWER REDUCTION AT STANDBY MODE

BACKGROUND OF THE INVENTION

1. Field of the Invention

The present invention relates to a semiconductor integrated circuit device, and more specifically to a semiconductor integrated circuit device suitable to control the threshold value thereof for power reduction at standby time.

2. Description of the Prior Art

In general, one of the effective methods of reducing the power consumption of a semiconductor integrated circuit device including MOSFETs, in particular of a CMOS integrated circuit is to reduce the supply voltage thereof. When the supply voltage is reduced, however, the operating speed of the CMOS circuit inevitably decreases.

Therefore, when not only the supply voltage but also the threshold value are both reduced, it is possible to reduce the power consumption at operation time without decreasing the circuit operating speed. In this case, however, when the threshold value is reduced, since the subthreshold current of the MOSFET increases at standby time, the consumption power increases at standby time. Therefore, it is desirable to keep the threshold value high at standby time but low at operation time.

The threshold value of the MOSFET is modulated by the substrate potential (back gate effect). Therefore, when a bias voltage is applied to the substrate (a potential lower than the source is applied in an NMOS but a potential higher than the source is applied in a PMOS), the threshold value can be increased. Therefore, a technique for controlling the threshold value of the MOSFET by utilization of this phenomenon has been developed, as disclosed by a reference document 1: K. Seta, et al., "50% Active-Power Saving without Speed Degradation using Stand-by Power Reduction (SPR) Circuit" ISSCC Digest of Technical Papers, pp. 318–319, February, 1995.

FIG. 16 shows the construction of a threshold value control circuit as disclosed by this reference document 1, in which the threshold value is switched from the standby time to the operation time or vice versa. For instance, at standby time, −2V is applied to a P well or a P type substrate (referred to as a P-type semiconductor substrate), and 4V is applied to an N well or an N type substrate (referred to as an N-type semiconductor substrate). Further, at operation time, 0V is applied to the P-type semiconductor substrate and 2V is applied to the N-type semiconductor substrate.

In the above-mentioned circuit as shown in FIG. 16, however, two new supply voltages $V_{PBB}$ (=−2V) and $V_{NBB}$ (=4V) are necessary in addition to a drive supply voltage $V_{DD}$ (=−2V) and a ground supply voltage GND (=0V).

Further, in the circuit as shown in FIG. 16, the substrate terminal of an NMOSFET is connected to the supply voltage GND; the substrate terminal of another NMOSFET is connected to the supply voltage $V_{PBB}$; the substrate terminal of a PMOSFET is connected to the supply voltage $V_{DD}$; and the substrate terminal of another PMOSFET is connected to the supply voltage $V_{NBB}$, so that a triple-well structure is required, thus causing a problem in that the manufacturing process inevitably increases.

SUMMARY OF THE INVENTION

With these problems in mind, therefore, it is the object of the present invention to provide a semiconductor integrated circuit device which can control the threshold value thereof, without use of any supply voltages other than the drive and ground supply voltages.

To achieve the above-mentioned object, the first aspect of the present invention provides a semiconductor integrated circuit device, comprising: a substrate potential generating circuit operative on the basis of a control signal, for deepening a substrate bias by pumping out charges from a semiconductor substrate when activated, but for setting an output thereof to a high impedance when deactivated; and a switch circuit operative on the basis of the control signal and turned on when said substrate potential generating circuit is deactivated, to set potential of the semiconductor substrate to a supply potential, but turned off when said substrate potential generating circuit is activated.

Further, the second aspect of the present invention provides a semiconductor integrated circuit device, comprising: a substrate potential detecting circuit for detecting potential of a semiconductor substrate; a substrate potential generating circuit for deepening a substrate bias by pumping out charges from the semiconductor substrate when activated, but for setting an output thereof to a high impedance when deactivated; a switch circuit turned on when said substrate potential generating circuit is deactivated, to connect the semiconductor substrate to a supply voltage, but turned off when said substrate potential generating circuit is activated; and a control circuit for driving said substrate potential generating circuit and said switch circuit on the basis of a control signal, a value detected by said substrate potential detecting circuit, and a set value, to control the potential of the semiconductor substrate to the set value or a potential of the supply voltage.

Further, the third aspect of the present invention provides a semiconductor integrated circuit device, comprising: a leak current detecting circuit for detecting leak current of a transistor formed on a semiconductor substrate; a substrate potential generating circuit for deepening a substrate bias by pumping out charges from the semiconductor substrate when activated, but for setting an output thereof to a high impedance when deactivated; a switch circuit turned on when said substrate potential generating circuit is deactivated, to connect the semiconductor substrate to a supply voltage, but turned off when said substrate potential generating circuit is activated; and a control circuit for driving said substrate potential generating circuit and said switch circuit on the basis of a control signal, a value detected by said substrate potential detecting circuit and a set value, to control the potential of the semiconductor substrate to the set value or a potential of the supply voltage.

Further, the fourth aspect of the present invention provides a semiconductor integrated circuit device, comprising: a first pump circuit having an output terminal connected to a first-conductivity type semiconductor substrate, for pumping out first-conductivity type carriers; a first MOSFET with a second-conductivity type different from the first-conductivity type having a source terminal connected to the output terminal of said first pump circuit and a drain terminal connected to a first supply voltage; a second pump circuit having an output terminal connected to a gate terminal of the first MOSFET, for pumping out first-conductivity type carriers; and a second MOSFET with the first-conductivity type having a source terminal connected to a second supply voltage, a gate terminal to which a control signal is applied, and a drain terminal connected to the gate terminal of said first MOSFET.

Further, it is preferable that the semiconductor integrated circuit device further comprises first and second rectifying circuits connected between the gate and source terminals of said first MOSFET in such a way that polarity thereof is inverse parallel to each other.

Further, it is preferable that the semiconductor substrate is of P-type semiconductor substrate; said first MOSFET is an N-channel MOSFET; said second MOSFET is a P-channel MOSFET; the first supply voltage is a ground supply voltage, and the second supply voltage is a drive supply voltage.

Further, it is preferable that the semiconductor substrate is of N-type semiconductor substrate; said first MOSFET is a P-channel MOSFET; said second MOSFET is an N-channel MOSFET; the first supply voltage is a ground supply voltage, and the second supply voltage is a drive supply voltage.

Further, it is preferable that the semiconductor integrated circuit device further comprises a third MOSFET with the first-conductivity type having a gate terminal connected to the first supply voltage and connected between the drain terminal of said second MOSFET and the gate terminal of said first MOSFET.

Further, it is preferable that the semiconductor substrate is of P-type semiconductor substrate; said first MOSFET is an N-channel MOSFET; said second and third MOSFETs are P-channel MOSFETs; the first supply voltage is a ground supply voltage, and the second supply voltage is a drive supply voltage.

Further, it is preferable that the semiconductor integrated circuit device further comprises an N-channel MOS having a gate terminal connected to the ground supply voltage, and connected between the source terminal of said first MOSFET and an output terminal of one of said two rectifying circuits, for passing current from the gate terminal to the source terminal of said first MOSFET.

Further, it is preferable that the semiconductor substrate is of N-type semiconductor substrate; said first MOSFET is a P-channel MOSFET; said second and third MOSFETs are N-channel MOSFETs; the first supply voltage is a drive supply voltage, and the second supply voltage is a ground supply voltage.

Further, it is preferable that the semiconductor integrated circuit device further comprises a P-channel MOS having a grounded gate terminal connected to the drive supply voltage, and connected between the source terminal of said first MOSFET and an input terminal of one of said two rectifying circuits, for passing current from the source terminal to the gate terminal of said first MOSFET.

Further, it is preferable that each of said first and second rectifying circuits is composed of a single diode element or a plurality of series-connected diode elements.

DETAILED DESCRIPTION OF THE EMBODIMENTS

The embodiments of the present invention will be described hereinbelow with reference to the attached drawings.

In the following description, "semiconductor substrate" implies a substrate or a well. Further, "substrate bias is deep" implies that the potential at the semiconductor substrate is low in the case where the semiconductor substrate is of P-type substrate or of P-type well, but the potential at the semiconductor substrate is high in the case where the semiconductor substrate is of N-type substrate or of N-type well. Further, "substrate bias is shallow" implies that the potential is opposite to the case where "substrate bias is deep"; that is, the potential is high in the P-type, but low in the N-type.

First Embodiment

Figure 1:
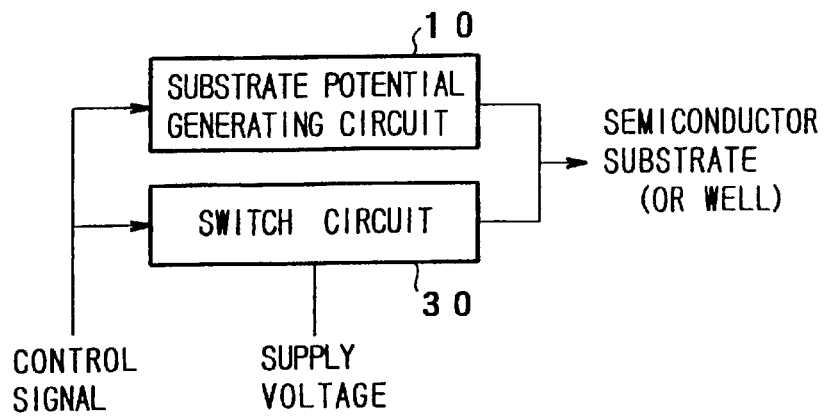
FIG. 1 is a block diagram showing a first embodiment of the semiconductor integrated circuit device according to the present invention.

FIG. 1 shows the first embodiment of the semiconductor integrated circuit device according to the present invention. The semiconductor integrated circuit device shown in FIG. 1 comprises a substrate potential generating circuit 10 and a switch circuit 30.

The substrate potential generating circuit 10 is operative on the basis of a control signal, and sets the substrate bias to be deep by pumping out charges from the semiconductor substrate when activated, but sets the output thereof to a high impedance when deactivated. On the other hand, the switch circuit 30 is turned on or off on the basis of the control signal, to connect the semiconductor substrate to the supply voltage when turned on, but disconnects the semiconductor substrate from the supply voltage when turned off. Further, when the substrate potential generating circuit 10 is activated, the switch circuit 30 is turned off, but when the substrate potential generating circuit 10 is deactivated, the switch circuit 30 is turned on.

Therefore, according to the control signal:

1) When the output of the substrate potential generating circuit 10 is at a high impedance and when the switch circuit 30 is turned on, the potential of the semiconductor substrate becomes equal to the potential of the supply voltage. Or else:
2) When the substrate potential generating circuit 10 generates a potential to the output thereof and when the switch circuit 30 is turned off, the potential of the semiconductor substrate becomes equal to the output potential of the substrate potential generating circuit 10.

Therefore, when the substrate potential generating circuit 10 is activated at the standby time of the MOSFET whose threshold value is to be controlled, a potential lower than the ground supply voltage GND can be applied to an NMOSFET, and further a potential higher than the supply voltage $V_{DD}$ can be applied to a PMOSFET, both inside the semiconductor integrated circuit, without use of any external supply voltages, with the result that it is possible to increase the threshold value at standby time. Further, when the substrate potential generating circuit 10 is deactivated (the output is in the high impedance status) at the operation time of the MOSFET whose threshold value is to be controlled, the switch circuit 30 connected to the supply voltage is turned on to set the potential of the semiconductor substrate to be equal to the supply voltage, with the result that it is possible to decrease the threshold value at operation time.

Figure 2A:
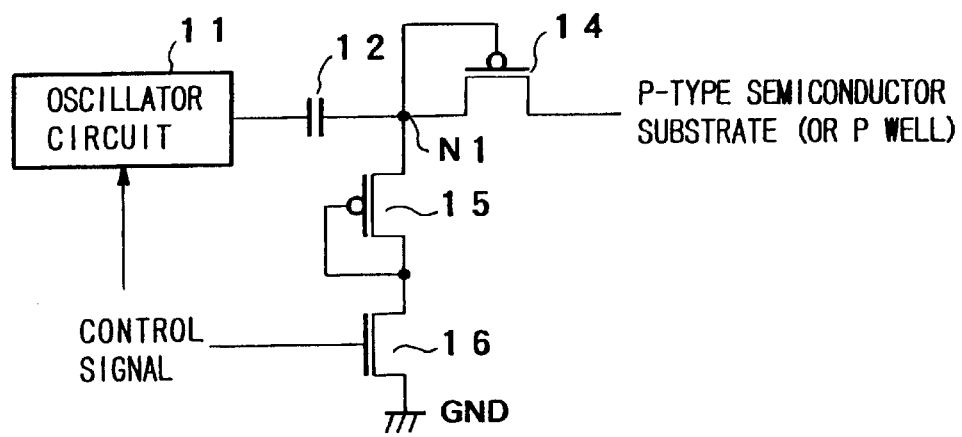
FIGS. 2A and 2B are circuit diagrams showing substrate potential generating circuits related to the semiconductor integrated circuit device according to the present invention.
Figure 2B:
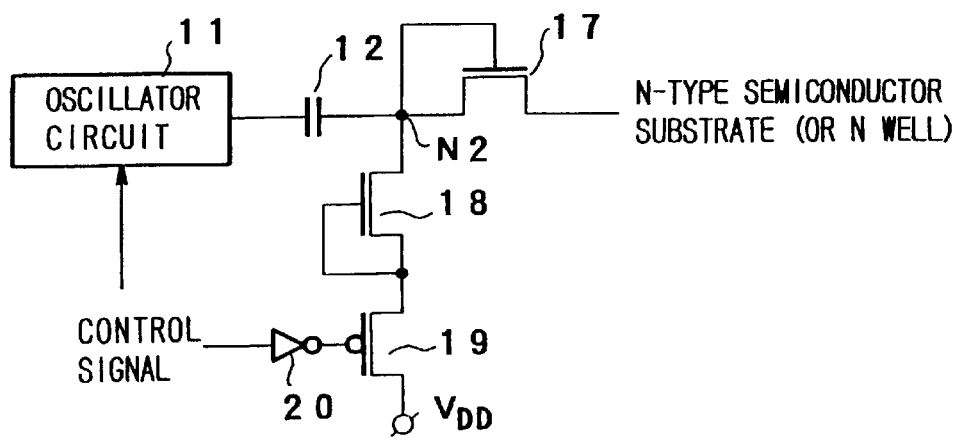

Further, FIGS. 2A and 2B show a practical circuit construction of the substrate potential generating circuit 10, when applied to a P-type semiconductor substrate and an N-type semiconductor substrate, respectively.

As shown in FIG. 2A, the substrate potential generating circuit 10 applied to the P-type semiconductor substrate comprises an oscillator circuit 11 (e.g., constructed by a ring oscillator) for generating a pulse voltage on the basis of the control signal, a capacitor 12, two PMOS transistors 14 and 15, and an NMOS transistor 16. Now, when the control signal is at an H level, the NMOS transistor 16 is turned on and further the oscillator circuit 11 is activated to increase or decrease the potential periodically at one end of the capacitor 12 connected to the output end of the oscillator circuit 11. Therefore, the potential at a junction node N1 between the two PMOS transistors 14 and 15 changes up and down. When the potential at the node N1 becomes lower than an addition of the substrate potential of the P-type semiconductor substrate and the threshold value voltage of the PMOS transistor 14, the PMOS transistor 14 is turned on, so that current flows from the P-type semiconductor substrate to the node N1. At this moment, the PMOS transistor 15 is kept turned off. Further, When the potential at the node N1 is raised by the oscillator circuit 11 and thereby becomes higher than the threshold value voltage of the PMOS transistor 15, the PMOS transistor 15 is turned on, so that current flows from the node N1 to the ground supply voltage GND through the NMOS transistor 16. At this moment, the PMOS transistor 14 is kept turned off. By repeating the above-mentioned operation, electrons flow from the ground supply voltage GND to the P-type semiconductor substrate, so that the potential of the P-type semiconductor substrate is reduced; that is, the substrate bias is deepened. On the other hand, when the control signal is at an L level, the NMOS transistor 16 is turned off and further the oscillator circuit 11 is deactivated, so that the potential at the node N1 becomes an intermediate potential between the P-type semiconductor substrate potential and the ground potential GND. As a result, the PMOS transistors 14 and 15 are both turned off, so that the output of the substrate potential generating circuit 10 becomes the high impedance.

Further, as shown in FIG. 2B, the substrate potential generating circuit 10 applied to the N-type semiconductor substrate comprises an oscillator circuit 11, a capacitor 12, two NMOS transistors 17 and 18, and a PMOS transistor 19. When the control signal is at the H level, the substrate potential generating circuit 10 as shown in FIG. 2B is activated in such a way that electrons flow from the N-type semiconductor substrate to the drive supply voltage $V_{DD}$, SO that the potential of the N-type semiconductor substrate is raised and thereby the substrate bias is deepened. Further, when the control signal is at the L level, the NMOS transistors 17 and 18 and the PMOS transistor 19 are all turned off, with the result that the output of the substrate potential generating circuit 10 becomes the high impedance.

Figure 3A:
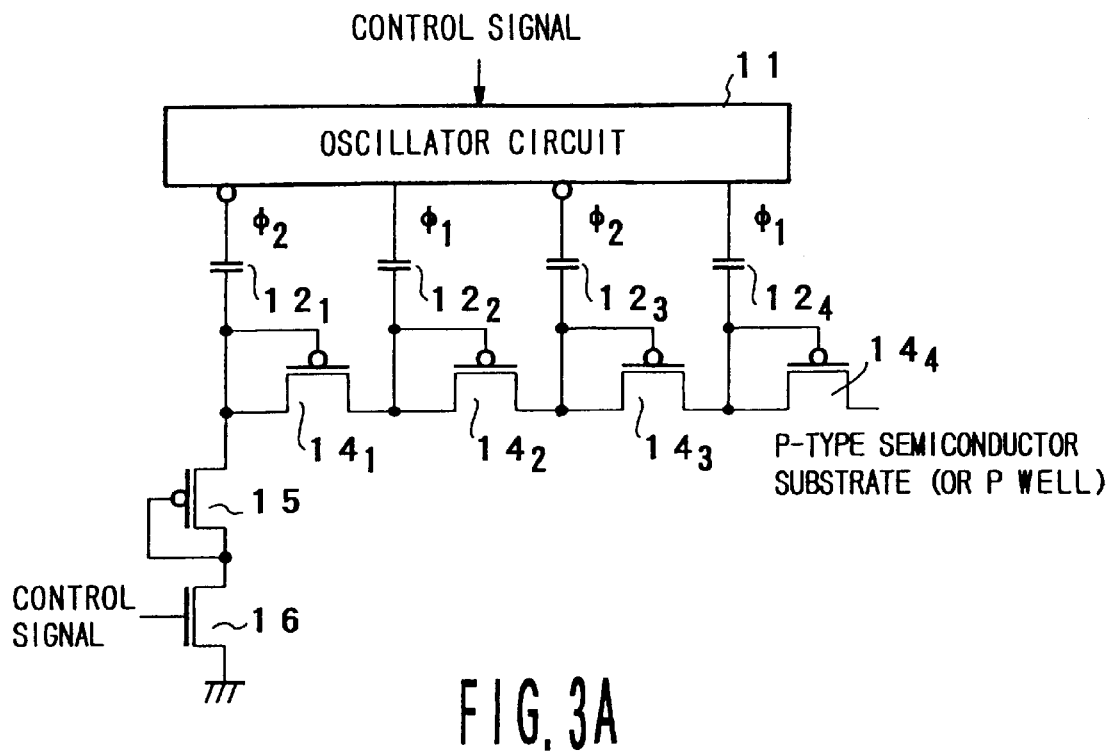
FIGS. 3A and 3B are circuit diagrams showing the other substrate potential generating circuits related to the semiconductor integrated circuit device according to the present invention.
Figure 3B:
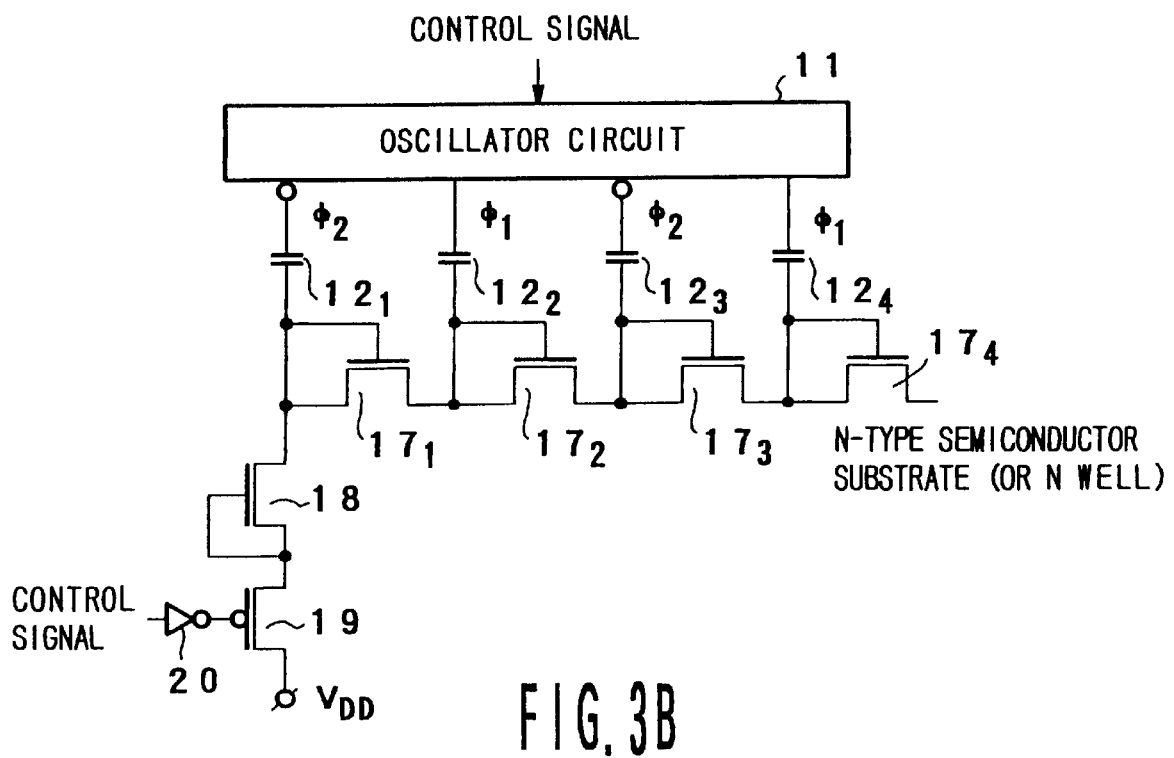

Further, FIGS. 3A and 3B show a substrate potential generating circuit 10, respectively, used when still a deeper substrate bias is required.

In the case of the P-type semiconductor substrate, as shown in FIG. 3A, a plurality of PMOS transistors $14_1$, $14_2$, $14_3$ and $14_4$ are connected as a multi-stage (e.g., four stages as shown) substrate potential generating circuit. Further, in the case of the N-type semiconductor substrate, as shown in FIG. 3B, a plurality of NMOS transistors $17_1$, $17_2$, $17_3$ and $17_4$ are connected as a multi-stage (e.g., four stages as shown) of the substrate potential generating circuit. In both the cases, two adjacent outputs $\phi_1$ and $\phi_2$ of the oscillator circuit are determined 180 degrees out of phase from each other, so that the MOS transistors can be activated alternately.

Second Embodiment

Figure 4:
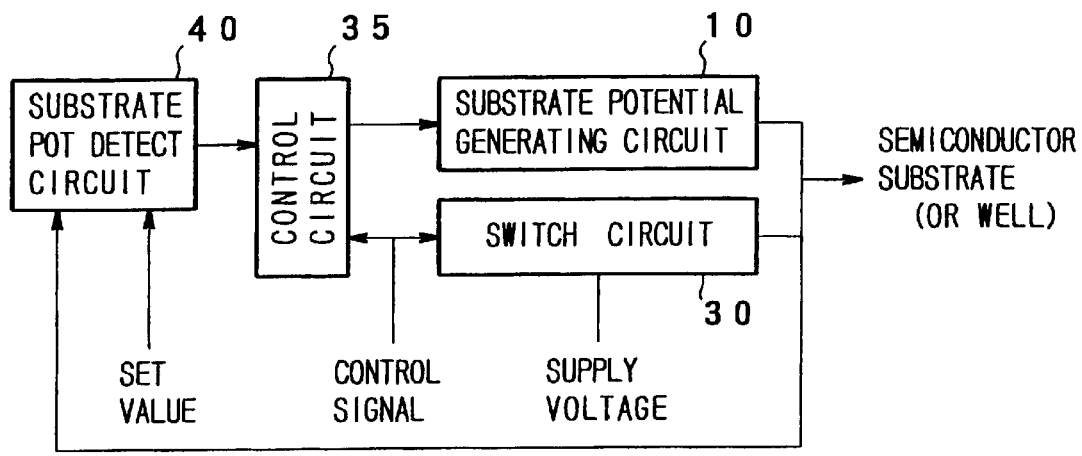
FIG. 4 is a block diagram showing a second embodiment of the semiconductor integrated circuit device according to the present invention.

FIG. 4 shows the second embodiment of the semiconductor integrated circuit device according to the present invention. In the semiconductor integrated circuit device shown in FIG. 4, a control circuit 35 and a substrate potential detecting circuit 40 are newly added to the circuit device of the first embodiment shown in FIG. 1.

The substrate potential detecting circuit 40 detects the substrate potential (also referred to as substrate bias). On the other hand, the control circuit 35 drives the substrate potential generating circuit 10 and the switch circuit 30 on the basis of the control signal of the control circuit 35 and the detected value of the substrate potential detecting circuit 40, in such a way that the potential of the semiconductor substrate can be equalized to a set value.

The operation of this second embodiment will be described hereinbelow. When the control signal is at an L level (i.e., when the MOSFET whose threshold value is to be controlled is in operation status), the substrate potential generating circuit 10 is deactivated by the control circuit 35, so that the output of the substrate potential generating circuit 10 becomes in a high impedance status. At this time, the switch circuit 30 is turned on. As a result, the potential of the semiconductor substrate becomes equal to the voltage supply potential, so that the MOSFET whose threshold value is to be controlled is lowered in the operation status.

On the other hand, when the control signal is at an H level (i.e., when the MOSFET whose threshold value is to be controlled is in standby status), the switch circuit 30 is turned off. In this case, when the substrate bias is shallower than a set value, the substrate potential generating circuit 10 is driven by the control circuit 35 in such a way that the bias of the semiconductor substrate can be deepened. Further, when the substrate bias is deepened beyond the set value, the substrate potential generating circuit 10 is deactivated by the control circuit 35, so that the output of the substrate potential generating circuit 10 becomes the high impedance. After that, the substrate bias is gradually shallowed by the leak current flowing between the source and the drain of the MOSFET whose threshold value is to be adjusted (formed on the semiconductor substrate). Further, when the substrate bias is shallowed beyond the set value, the substrate potential generating circuit 10 is driven again, so that the threshold value of the MOSFET is controlled at a predetermined set value in the standby status.

As described above, in the second embodiment of the semiconductor integrated circuit device according to the present invention, it is possible to control the threshold value thereof, without use of any new supply voltages other than the drive supply voltage $V_{DD}$ and the ground supply voltage GND.

Figure 5:
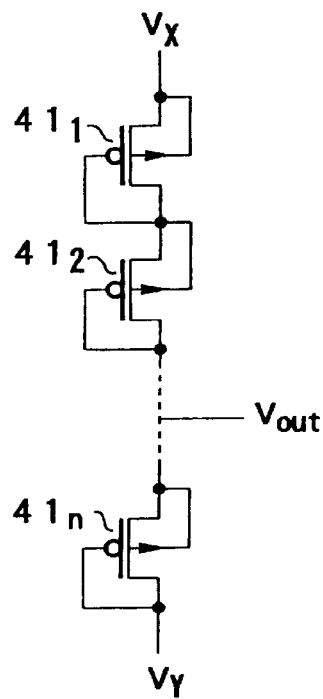
FIG. 5 is a circuit diagram showing a substrate potential detecting circuit related to the second embodiment of the semiconductor integrated circuit device according to the present invention.
Figures 6A, 6B:
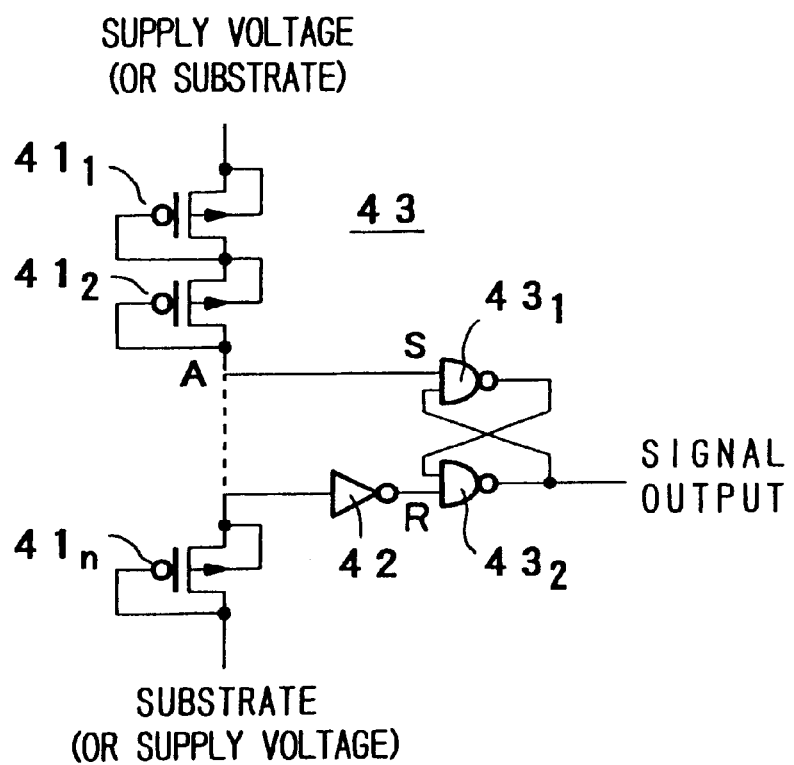
FIG. 6A is a circuit diagram showing the other substrate potential detecting circuit related to the second embodiment of the semiconductor integrated circuit device according to the present invention.
FIG. 6B is a table listing the input and output relationship of the substrate potential detecting circuit shown in FIG. 6A.

FIG. 5, FIG. 6A and FIG. 6B show a practical circuit construction of the substrate potential detecting circuit 40 used for the above-mentioned second embodiment, respectively.

FIG. 5 shows a first example of the substrate potential detecting circuit 40, which is composed of n-units of series-connected PMOS transistors $41_1$, $41_2$, $41_3$, ..., $41_n$. Each transistor operates in a sub-threshold range, and an output $V_{out}$ is derived from an intermediate junction node. In each PMOS transistor $41_i$ (i=1, 2, ..., n), each substrate terminal thereof is connected to each source terminal thereof, and each gate terminal thereof is connected to each drain terminal thereof. Further, when the substrate whose potential is to be detected is a P-type semiconductor substrate, the source terminal $V_X$ of the transistor 411 is connected to a drive supply voltage $V_{DD}$, and the drain terminal $V_Y$ of the transistor $41_n$ is connected to the P-type semiconductor substrate. Further, when the substrate whose potential is to be detected is an N-type semiconductor substrate, the source terminal $V_X$ of the transistor $41_1$ is connected to the N-type semiconductor substrate, and the drain terminal $V_Y$ of the transistor $41_n$ is connected to the ground supply voltage.

Further, FIG. 6A shows a second example of the substrate potential detecting circuit 40, which is composed of n-units of series-connected PMOS transistors $41_1$, $41_2$, $41_3$, ..., $41_n$, an inversion gate 42, an RS flip-flop 43 made up of two cross-connected NAND gates $43_1$ and $43_2$. Each transistor operates in a sub-threshold range. Further, two junction nodes A and B shown in FIG. 6A denote two different junction nodes of a transistor train. In the circuit construction as shown in FIG. 6A, the substrate potential detecting circuit 40 is provided with Schmidt gate characteristics having a hysteresis width corresponding to the potential difference between the two junction nodes A and B as listed in FIG. 6B, so that it is possible to construct the substrate potential detecting circuit 40 which is not susceptible to the influence of noise.

In the above-mentioned first and second examples, although the substrate potential detecting circuit 40 is constructed by the PMOS transistors, it is of course possible to construct the detecting circuit 40 by use of NMOS transistors. Further, another practical example of the substrate potential detecting circuit 40 is disclosed in Japanese Patent Application No. 8-11529 filed by the same Applicant.

Figure 17:
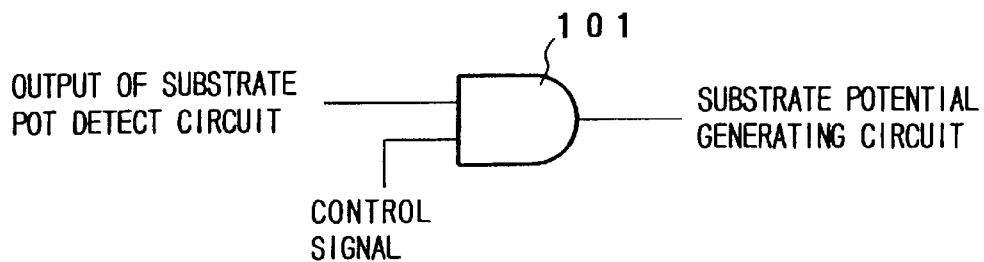
FIG. 17 is a circuit diagram showing a practical control circuit used for the second embodiment of the present invention.

FIG. 17 shows a practical construction of the control circuit 35 used for the second embodiment. The control circuit 35 is composed of an AND gate 101. The control signal and the output of the substrate potential detecting circuit 40 are both inputted to the AND gate 101. When the control signal is at the L level, the output of the AND gate 101 is at the L level, so that the substrate potential generating circuit 10 is deactivated.

On the other hand, the case where the control signal is at the H level will be taken into account. When the substrate bias is shallower than a set value, since the output of the substrate potential detecting circuit 40 is at the H level, the output of the AND gate 101, that is, the control circuit 35 is at the H level. Therefore, the substrate potential generating circuit 10 is activated, to deepen the substrate bias. When the substrate bias becomes deeper beyond the set value, since the output of the substrate potential detecting circuit 40 becomes the L level, the output of the AND gate, that is, the control circuit 35 is at the L level, so that the substrate potential generating circuit 10 is deactivated.

Further, precisely stating, the set value inputted to the substrate potential detecting circuit 40 is not inputted as a signal or a potential. Further, in the substrate potential detecting circuits as shown in FIGS. 5 and 6A, the intermediate junction node for deriving the output $V_{out}$ and the intermediate nodes A and B connected to the NAND gate $43_1$ and the inversion gate 42, respectively are both decided in such a way that when the substrate potential $V_Y$ is equal to the set value, the signal output $V_{out}$ becomes equal to the input threshold value of the control circuit 35.

Third Embodiment

Figure 7:
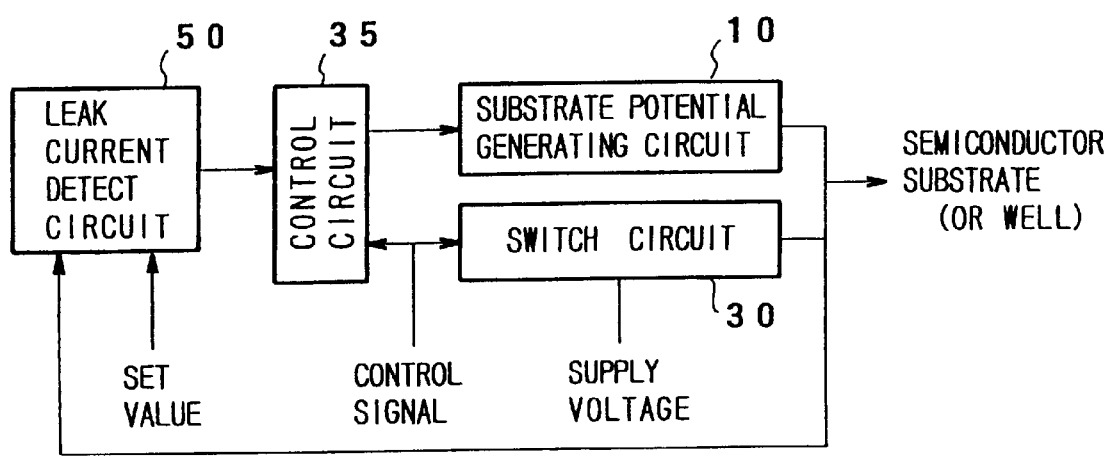
FIG. 7 is a block diagram showing a third embodiment of the semiconductor integrated circuit device according to the present invention.
Figure 8:
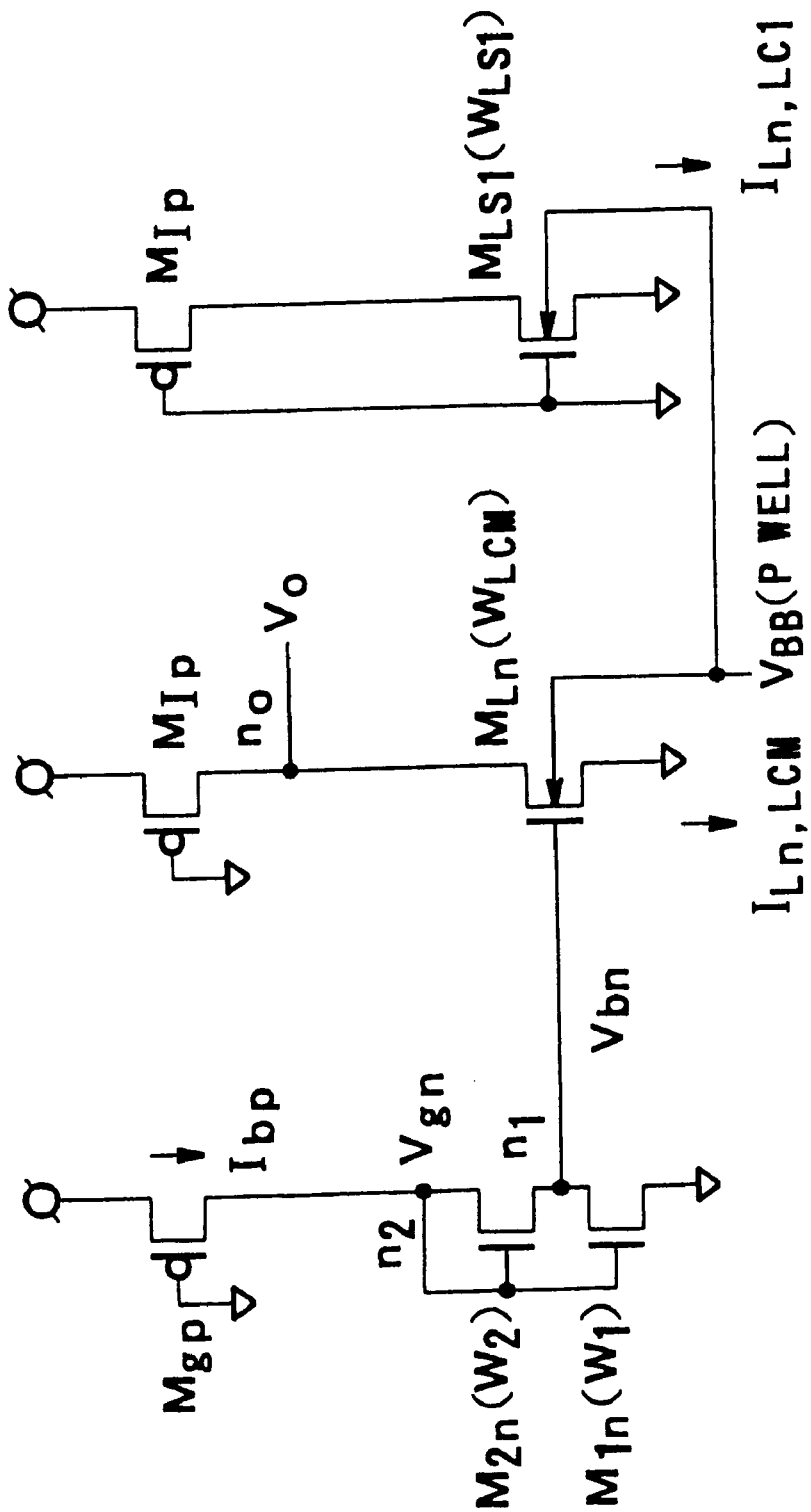
FIG. 8 is a circuit diagram showing a leak current detecting circuit related to the third embodiment of the semiconductor integrated circuit device according to the present invention.

FIG. 7 shows the third embodiment of the semiconductor integrated circuit device according to the present invention. In the semiconductor integrated circuit device shown in FIG. 7, the substrate potential detecting circuit 40 of the second embodiment semiconductor integrated circuit device is replaced with a leak current detecting circuit 50. This leak current detecting circuit 50 can detect the leak current of the MOSFET formed on the same substrate. When the substrate bias becomes shallow, the leak current of the MOSFET becomes large. On the other hand, when the substrate bias becomes deep, the leak current of the MOSFET becomes small. FIG. 8 shows a practical example of the leak current detecting circuit, which is disclosed in detail in Japanese Patent Application No. 7-225576 filed by the same Applicant. In the leak current detecting circuit 50 shown in FIG. 8, a leak current detecting N-channel MOS transistor $M_{Ln}$ is provided to detect the leak current of an N-channel MOS transistor $M_{LSI}$ which represents an LSI equivalently. To apply a gate voltage $V_{bn}$ to this N-channel MOS transistor $M_{Ln}$ two N-channel MOS transistors $M_{1n}$ and $M_{2n}$ and a P-channel MOS transistor $M_{gp}$ are provided. The source of the N-channel MOS transistor $M_{1n}$ is grounded. The drain of the N-channel MOS transistor $M_{2n}$ is connected to the P-channel MOS transistor $M_{gp}$ (as a current source transistor), and the source thereof $M_{2n}$ is connected to the drain of the N-channel MOS transistor $M_{1n}$. Further, the two gate terminals of the N-channel MOS transistors $M_{1n}$ and $M_{2n}$ are connected to the drains of the two transistors $M_{gp}$ and $M_{2n}$. Further, a junction point between the drain terminal of the N-channel MOS transistor $M_{1n}$ and the source terminal of the N-channel MOS transistor $M_{2n}$ is connected to the gate of the N-channel MOS transistor $M_{Ln}$ for detecting the leak current of the N-channel MOS transistor $M_{LSI}$.

Here, the current value $I_{bp}$ of the current source and the channel widths of the two N-channel MOS transistors $M_{1n}$ and $M_{2n}$ are so selected that the two N-channel MOS transistors $M_{1n}$ and $M_{2n}$ can be operative within the sub-threshold range, respectively. When set as described above, the potential difference between the gate terminal potential $V_{gn}$ of the N-channel MOS transistor $M_{1n}$ and the ground potential GND is determined roughly equal to or lower than the threshold value of the two N-channel MOS transistors $M_{1n}$ and $M_{2n}$.

Figure 18:
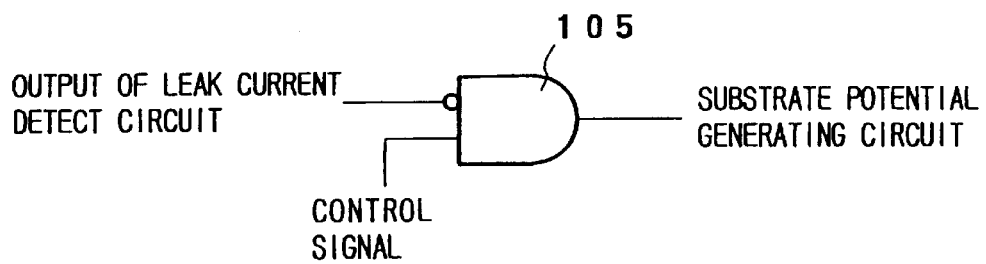
FIG. 18 is a circuit diagram showing a practical control circuit used for the third embodiment of the present invention.

Further, FIG. 18 shows a practical construction of the control circuit 35 used for this third embodiment. The control circuit 35 is composed of an AND gate 105. The control signal and the inversion output of the leak current detecting circuit 50 are both inputted to the AND gate 105.

The operation of the third embodiment will be described hereinbelow.

When the control signal is at an L level (i.e., when the MOSFET whose threshold value is to be controlled is in operation status), the output of the control circuit 35, that is, the AND gate 105 is at the L level, so that the substrate potential generating circuit 10 is deactivated. Further, the switch circuit 30 is turned on. As a result, the potential of the semiconductor substrate becomes equal to the voltage supply potential, so that the threshold value of the MOSFET whose threshold value is to be controlled is lowered.

On the other hand, when the control signal is at an H level (i.e., when the MOSFET whose threshold value is to be controlled is in standby status), the switch circuit 30 is turned off. In this case, when the substrate bias is shallower than a set value and thereby the leak current is larger than a set value, the output of the leak current detecting circuit 50 is at the L level, so that the output of the control circuit 35 is at the H level. Therefore, the substrate potential generating circuit 10 is driven to deepen the substrate bias. When the substrate bias becomes deep, the leak current decreases. When the leak current becomes smaller than the set value, the output of the leak current detecting circuit 50 becomes the H level. Therefore, the output of the control circuit 3 becomes the L level, so that the substrate potential generating circuit 10 is deactivated. After that, the substrate bias is shallowed gradually by the leak current flowing between the source and the drain of the MOSFET formed on the semiconductor substrate. Further, when the leak current becomes larger than the set value, the substrate potential generating circuit 10 is driven again, so that the leak current of the MOSFET is controlled at a predetermined set value in the standby status. In other words, the threshold value of the MOSFET can be controlled in such a way as to be set to a predetermined value at the standby time.

As described above, in the third embodiment of the semiconductor integrated circuit device according to the present invention, it is possible to control the threshold value thereof, without use of any supply voltages other than the drive supply voltage $V_{DD}$ and the ground supply voltage GND.

Fourth Embodiment

Figure 9:
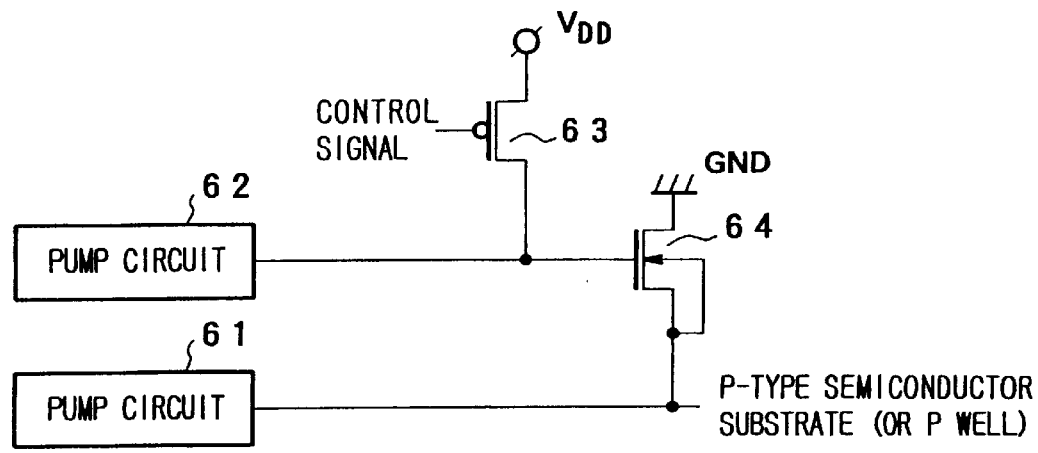
FIG. 9 is a block diagram showing a fourth embodiment of the semiconductor integrated circuit device according to the present invention.

FIG. 9 shows the fourth embodiment of the semiconductor integrated circuit device according to the present invention. The semiconductor integrated circuit device shown in FIG. 9 can be used for a P-type semiconductor substrate, which is composed of two pump circuits 61 and 62, a PMOS transistor 63, and an NMOS transistor 64.

When the MOSFET whose threshold value is to be controlled is in standby mode, the two pump circuits 61 and 62 are both activated to pump out electrons and further to send the pumped-out electrons to an output terminal thereof. However, when the MOSFET is in operation mode, the two pump circuits 61 and 62 are both deactivated to change the outputs thereof to a high impedance, respectively.

In the circuit shown in FIG. 9, a control signal is applied to the gate of the PMOS transistor 63; a supply voltage $V_{DD}$ is applied to the source thereof; and the drain thereof is connected to the output terminal of the pump circuit 62. Further, the gate of the NMOS transistor 64 is connected to the output of the pump circuit 62; a supply voltage GND is applied to the drain thereof; and the output of the pump circuit 61 and the P-type semiconductor are both connected to the source thereof. Here, the NMOS transistor 64 can be formed on the P-type semiconductor substrate on which the MOSFET whose threshold is to be controlled is formed. Or else, the NMOS transistor 64 can be formed on another P-type semiconductor substrate. In the case where the NMOS transistor 64 is formed on another semiconductor substrate, it is necessary to equalize the threshold value of another P-type semiconductor substrate to that of the P-type semiconductor substrate on which the MOSFET whose threshold is to be controlled is formed.

In this fourth embodiment, the pump circuit 61 corresponds to the substrate potential generating circuit 10 of the first embodiment, and the pump circuit 62, the PMOS transistor 63 and the NMOS transistor 64 correspond to the switch circuit 30. Further, the output capacitance of the pump circuit 62 is so selected as to be sufficiently smaller than that of the pump circuit 61.

The operation of this fourth embodiment will be described hereinbelow. When the MOSFET whose threshold value is to be controlled is in standby mode, the two pump circuits 61 and 62 are both activated, so that electrons are pumped out and further sent to each output terminal thereof. In the standby mode, since the control signal is at an H level, the PMOS transistor 63 is turned off, so that the potential at the gate and the source of the NMOS transistor 64 drops. However, since the output capacitance of the pump circuit 62 is sufficiently smaller than that of the pump circuit 61, the NMOS transistor 64 is perfectly turned off. As a result, the potential of the P-type semiconductor substrate becomes equal to the output potential (lower than GND) of the pump circuit 61, so that the threshold value can be raised.

In contrast with this, when the MOSFET whose threshold value is to be controlled is in operation mode, the two pump circuits 61 and 62 are both deactivated, so that both the outputs thereof are at a high impedance, respectively In this operation mode, since the control signal is at an L level, the PMOS transistor 63 is turned on, so that the potential at the gate and the source of the NMOS transistor 64 rises, so that the NMOS transistor 64 is turned on. As a result, the potential of the P-type semiconductor substrate becomes equal to the ground potential GND, so that the threshold value can be lowered.

As described above, in the fourth embodiment of the semiconductor integrated circuit device according to the present invention, it is possible to control the threshold value thereof, without use of any supply voltages other than the drive supply voltage $V_{DD}$ and the ground supply voltage GND.

Fifth Embodiment

Figure 10:
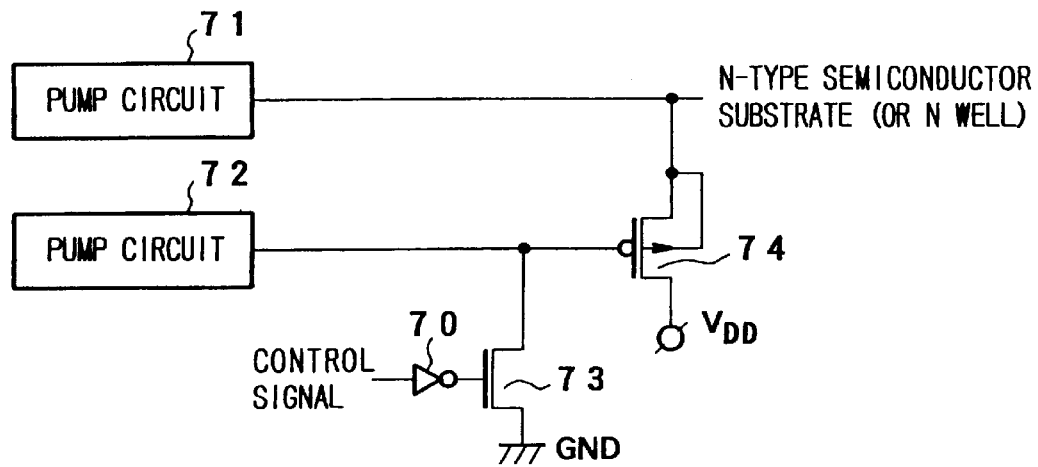
FIG. 10 is a block diagram showing a fifth embodiment of the semiconductor integrated circuit device according to the present invention.

FIG. 10 shows the fifth embodiment of the semiconductor integrated circuit device according to the present invention. The semiconductor integrated circuit device shown in FIG. 10 can be used for an N-type semiconductor substrate, which is composed of two pump circuits 71 and 72, an inversion gate 70, an NMOS transistor 73, and a PMOS transistor 74.

When the MOSFET whose threshold value is to be controlled is in standby mode, the two pump circuits 71 and 72 are both activated to pump out electrons and to send the pumped-out electrons to the output terminal thereof, respectively. On the other hand, when the MOSFET is in operation mode, the two pump circuits 71 and 72 are both deactivated to change the outputs thereof to a high impedance, respectively.

In the circuit shown in FIG. 10, a control signal is applied to the gate of the NMOS transistor 73 via the inversion gate 70. The source of the NMOS transistor 73 is connected to the ground supply voltage GND, and the drain thereof is connected to the output terminal of the pump circuit 72. Further, the gate of the PMOS transistor 74 is connected to the output of the pump circuit 72; the drain thereof is connected to the drive supply voltage $V_{DD}$; and the source thereof is connected to the output of the pump circuit 71 and the N-type semiconductor. Here, the PMOS transistor 74 can be formed on the N-type semiconductor substrate on which the MOSFET whose threshold is to be controlled is formed. Or else, the PMOS transistor 74 can be formed on another N-type semiconductor substrate. In the case where the PMOS transistor 74 is formed on another semiconductor substrate, it is necessary to equalize the threshold value of another N-type semiconductor substrate to that of the N-type semiconductor substrate on which the MOSFET whose threshold is to be controlled is formed.

The operation of this fifth embodiment will be described hereinbelow. When the MOSFET whose threshold value is to be controlled is in standby mode, the two pump circuits 71 and 72 are both activated, so that electrons are pumped out and sent to each output terminal thereof, respectively.

In this standby mode, since the control signal is at an H level, the NMOS transistor 73 is turned off, so that the potential at the gate and the source of the PMOS transistor 74 rises. However, since the output capacitance of the pump circuit 72 is sufficiently smaller than that of the pump circuit 71, the PMOS transistor 74 is perfectly turned off. As a result, the potential of the N-type semiconductor substrate becomes equal to the output potential (higher than $V_{DD}$) of the pump circuit 71, so that the threshold value can be raised.

In contrast with this, when the MOSFET whose threshold value is to be controlled is in operation mode, the two pump circuits 71 and 72 are both deactivated, so that both the outputs thereof are at a high impedance, respectively. In this operation mode, since the control signal is at an L level, the NMOS transistor 73 is turned on, so that the potential at the gate of the PMOS transistor 74 drops down to the ground potential GND, so that the PMOS transistor 74 is turned off. As a result, the potential of the N-type semiconductor substrate becomes equal to the drive supply voltage $V_{DD}$, so that the threshold value can be reduced.

As described above, in the fifth embodiment of the semiconductor integrated circuit device according to the present invention, it is possible to control the threshold value thereof, without use of any supply voltages other than the drive supply voltage $V_{DD}$ and the ground supply voltage GND.

Sixth Embodiment

Figure 11:
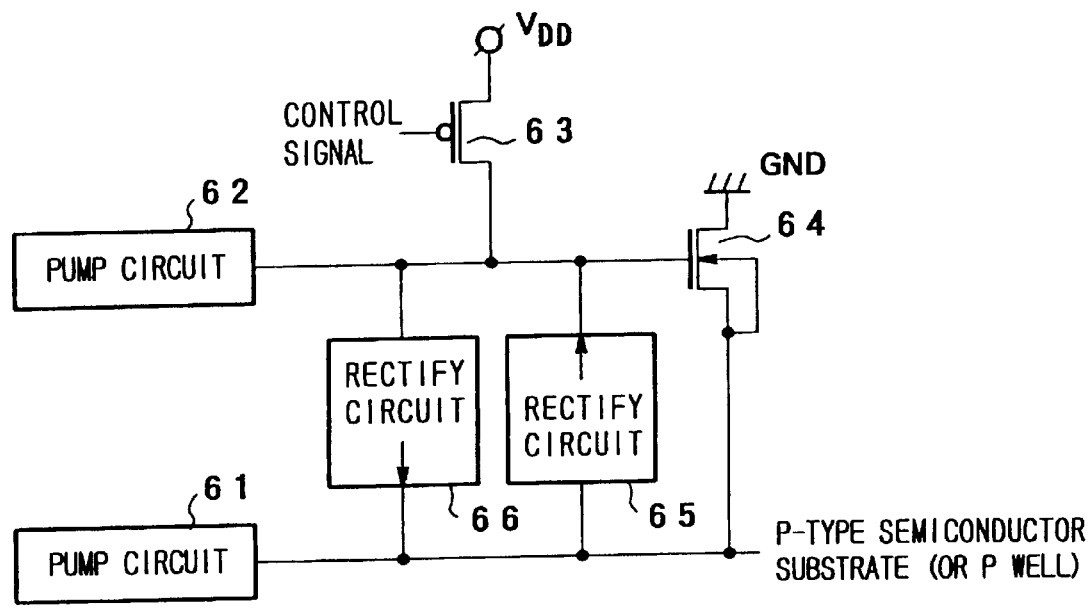
FIG. 11 is a block diagram showing a sixth embodiment of the semiconductor integrated circuit device according to the present invention.

FIG. 11 shows the sixth embodiment of the semiconductor integrated circuit device according to the present invention. In the semiconductor integrated circuit device shown in FIG. 11, two rectifying circuits 65 and 66 are newly added to the circuit device of the fourth embodiment shown in FIG. 9.

In the rectifying circuit 65, the input terminal thereof is connected to the source of the NMOS transistor 64, and the output terminal thereof is connected to the gate of the NMOS transistor 64. Further, the rectifying circuit 66 is connected in inverse parallel to the rectifying circuit 65 in such a way that the rectification polarity can be reversed.

The operation of the sixth embodiment is basically the same as with the case of the fourth embodiment except the following points: in the standby mode, when the gate potential of the NMOS transistor 64 becomes lower than the source potential thereof beyond a forward voltage (e.g., 0.8V) of the rectifying circuit 65, since the rectifying circuit 65 becomes conductive, the gate potential is clamped at a voltage the forward voltage (0.8V) lower than the source potential, so that electrons pumped out by the pump circuit 62 flow to the P-type semiconductor substrate through the rectifying circuit 65. As a result, the two pump circuits 61 and 62 can generate the substrate potential at the same time, so that it is possible to deepen the substrate bias more effectively, as compared with the case of the fourth embodiment. Further, in the operation mode, when the gate potential of the NMOS transistor 64 becomes higher than the source potential thereof beyond a forward voltage (e.g., 2.4V) of the rectifying circuit 66, since the rectifying circuit 66 becomes conductive, the gate potential is clamped at a voltage the forward voltage (2.4V) higher than the source potential, so that it is possible to prevent an excessive electric field from being applied to a gate oxide film of the NMOS transistor 64 and thereby to prevent the reliability of the transistor from being lowered.

Further, in this sixth embodiment, it is of course possible to obtain the similar effect as with the case of the fourth embodiment.

Seventh Embodiment

Figure 12:
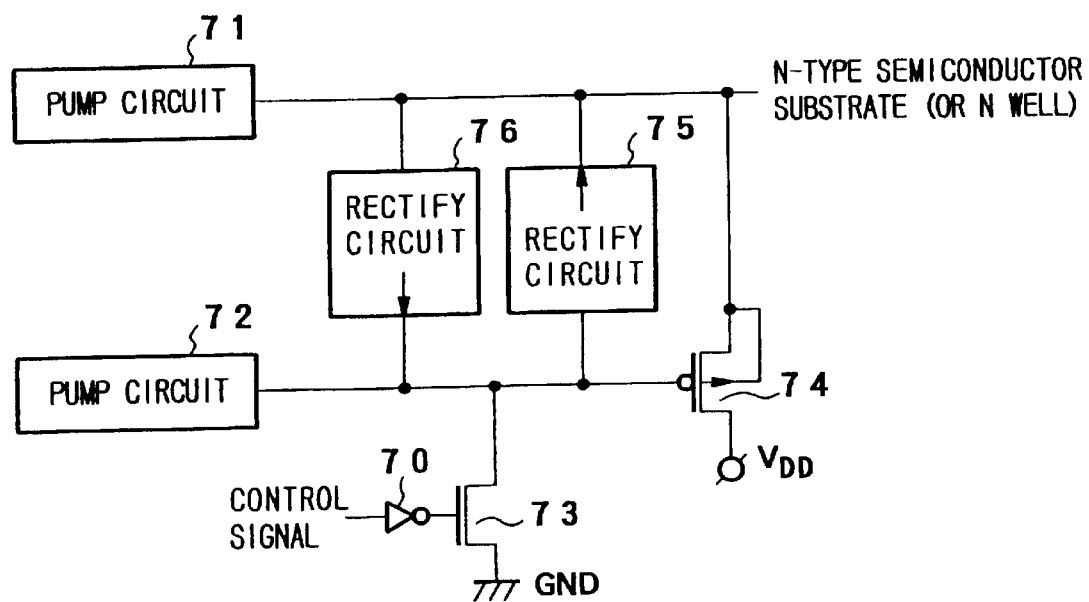
FIG. 12 is a block diagram showing a seventh embodiment of the semiconductor integrated circuit device according to the present invention.

FIG. 12 shows the seventh embodiment of the semiconductor integrated circuit device according to the present invention. In the semiconductor integrated circuit device shown in FIG. 12, two rectifying circuits 75 and 76 are newly added to the circuit device of the fifth embodiment shown in FIG. 10.

In the rectifying circuit 75, the input terminal thereof is connected to the gate of the PMOS transistor 74, and the output terminal thereof is connected to the source of the PMOS transistor 74. Further, the rectifying circuit 76 is connected in inverse parallel to the rectifying circuit 75 in such a way that the rectification polarity can be reversed.

The operation of the seventh embodiment is basically the same as with the case of the fifth embodiment except the following points: in the standby mode, when the gate potential of the PMOS transistor 74 becomes higher than the source potential thereof beyond a forward voltage (e.g., 0.8V) of the rectifying circuit 75, since the rectifying circuit 75 becomes conductive, the gate potential is clamped at a voltage the forward voltage (0.8V) higher than the source potential, so that electrons pumped out by the pump circuit 72 flow from the N-type semiconductor substrate through the rectifying circuit 75. As a result, the two pump circuits 71 and 72 can generate the substrate potential at the same time, so that it is possible to deepen the substrate bias more effectively, as compared with the case of the fifth embodiment.

Further, in the operation mode, when the gate potential of the PMOS transistor 74 becomes lower than the source potential thereof beyond a forward voltage (e.g., 2.4V) of the rectifying circuit 76, since the rectifying circuit 76 becomes conductive, the gate potential is clamped at a voltage the forward voltage (2.4V) lower than the source potential, so that it is possible to prevent an excessive electric field from being applied to a gate oxide film of the PMOS transistor 74 and thereby to prevent the reliability of the transistor from being lowered.

Further, in this seventh embodiment, it is of course possible to obtain the similar effect as with the case of the fifth embodiment.

Eighth Embodiment

Figure 13:
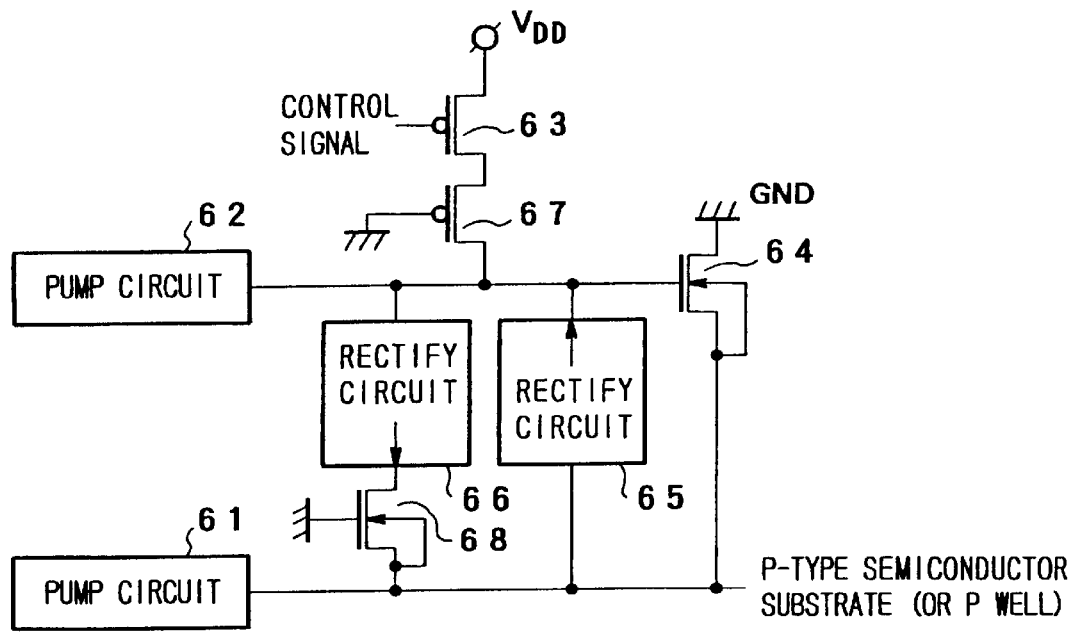
FIG. 13 is a block diagram showing an eighth embodiment of the semiconductor integrated circuit device according to the present invention.

FIG. 13 shows the eighth embodiment of the semiconductor integrated circuit device according to the present invention. In the semiconductor integrated circuit device shown in FIG. 13, a PMOS transistor 67 and an NMOS transistor 68 are both newly added to the circuit device of the sixth embodiment shown in FIG. 11.

The PMOS transistor 67 is connected between the drain of the PMOS transistor 63 and the output terminal of the pump circuit 62, and the gate thereof is grounded. Further, the NMOS transistor 68 is connected between the output terminal of the rectifying circuit 66 and the output terminal of the pump circuit 61, and the gate thereof is grounded. Here, the NMOS transistor 68 can be formed on the P-type semiconductor substrate on which the MOSFET whose threshold value is to be controlled is formed. Or else, the NMOS transistor 68 can be formed on another P-type semiconductor substrate. In the case where the NMOS transistor 68 is formed on another semiconductor substrate, it is necessary to equalize the threshold value of another P-type semiconductor substrate to that of the P-type semiconductor substrate on which the MOSFET whose threshold is to be controlled is formed.

The operation of the eighth embodiment is basically the same as with the case of the sixth embodiment shown in FIG. 6, except the following points: in the standby mode, when the gate potential of the NMOS transistor 64 is lowered beyond the ground potential GND, since the PMOS transistor 67 is connected, a potential lower than the ground potential GND is not applied to the drain of the PMOS transistor 63. Further, although a drive supply potential $V_{DD}$ is inputted to the gate of the PMOS transistor 63, since a potential lower than the ground potential GND is not applied to the drain of the PMOS transistor 63 as described above, it is possible to prevent an excessive electric field from being applied to the gate oxide film of the PMOS transistor 63. Further, although a potential lower than the ground potential GND is applied to the drain of the PMOS transistor 67, since the ground potential GND is applied to the gate of the PMOS transistor 67, it is also possible to prevent an excessive electric field from being applied to the gate oxide film of the PMOS transistor 63.

On the other hand, in the operation mode, when the substrate potential rises to a potential the threshold voltage of the NMOS transistor 68 lower than the ground potential GND, since the NMOS transistor 68 is turned off, no forward current flows through the rectifying circuit 66. Therefore, when it is unnecessary for the rectifying circuit 66 to protect the gate oxide film of the NMOS transistor 64, the rectifying circuit 66 is automatically turned off, so that it is possible to prevent an excessive dc current from being kept flowing from the drive supply voltage $V_{DD}$ to the substrate.

Ninth Embodiment

Figure 14:
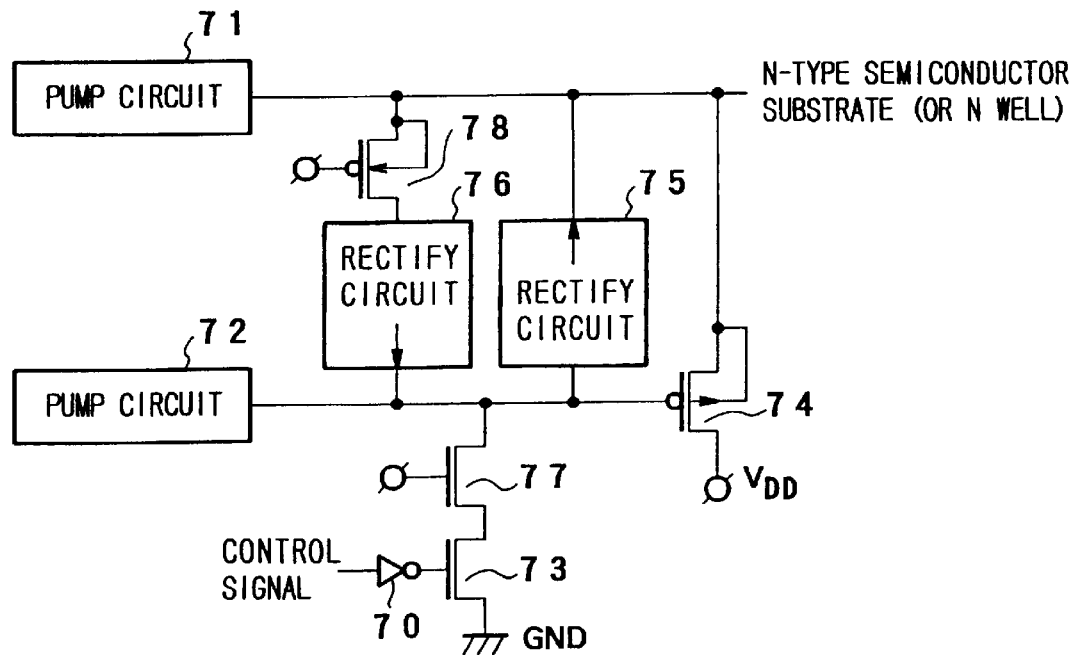
FIG. 14 is a block diagram showing a ninth embodiment of the semiconductor integrated circuit device according to the present invention.

FIG. 14 shows the ninth embodiment of the semiconductor integrated circuit device according to the present invention. In the semiconductor integrated circuit device shown in FIG. 14, an NMOS transistor 77 and a PMOS transistor 78 are both newly added to the circuit device of the seventh embodiment shown in FIG. 12.

The PMOS transistor 77 is connected between the drain of the NMOS transistor 73 and the output terminal of the pump circuit 72, and a drive supply potential $V_{DD}$ is applied to the gate thereof. Further, the PMOS transistor 78 is connected between the output terminal of the pump circuit 71 and the output terminal of the rectifying circuit 76, and the drive supply potential $V_{DD}$ is applied to the gate thereof. Here, the PMOS transistor 78 can be formed on the N-type semiconductor substrate on which the MOSFET whose threshold value is to be controlled is formed. Or else, the PMOS transistor 78 can be formed on another N-type semiconductor substrate. In the case where the NMOS transistor 78 is formed on another semiconductor substrate, it is necessary to equalize the threshold value of another N-type semiconductor substrate to that of the N-type semiconductor substrate on which the MOSFET whose threshold is to be controlled is formed.

The operation of the ninth embodiment is basically the same as with the case of the seventh embodiment shown in FIG. 12, except the following points: in the standby mode, when the gate potential of the PMOS transistor 74 becomes higher than the drive supply potential $V_{DD}$, since the NMOS transistor 77 is connected, a potential higher than the drive supply potential $V_{DD}$ is not applied to the drain of the NMOS transistor 73. Further, although a ground potential GND is applied to the gate of the NMOS transistor 73, since a potential higher than the drive supply potential $V_{DD}$ is not applied to the drain of the NMOS transistor 73 as described above, it is possible to prevent an excessive electric field from being applied to the gate oxide film of the NMOS transistor 73. Further, although a potential higher than the drive supply potential $V_{DD}$ is applied to the drain of the NMOS transistor 77, since the drive supply potential $V_{DD}$ is applied to the gate of the NMOS transistor 77, it is also possible to prevent an excessive electric field from being applied to the gate oxide film of the NMOS transistor 73.

On the other hand, in the operation mode, when the substrate potential drops down to a potential the threshold voltage of the PMOS transistor 78 higher than the drive supply potential $V_{DD}$, since the PMOS transistor 78 is turned off, no forward current flows through the rectifying circuit 76. Therefore, when it is unnecessary for the rectifying circuit 76 to protect the gate oxide film of the PMOS transistor 74, the rectifying circuit 76 is automatically turned off, so that it is possible to prevent an excessive dc current from being kept flowing from the ground potential GND to the substrate.

Figure 15A:
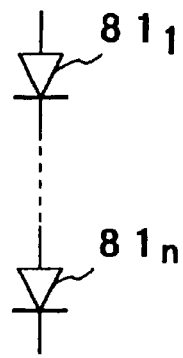
FIGS. 15A to 15C are practical circuit diagrams showing a rectifying circuit, respectively.

In the above-mentioned sixth to ninth embodiments, although the rectifying circuits are used, each of these rectifying circuits can be constructed by a signal diode element. In this case, the forward voltage is 0.8V. Further, as shown in FIG. 15A, each of the rectifying circuits can be constructed by connecting a plurality of diode elements $81_1, \ldots, 81_n$ in series. For instance, when three series-connected diodes are used, the forward voltage can be increased up to 2.4V.

Figure 15B:
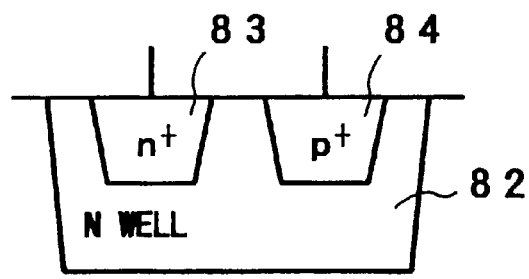
Figure 15C:
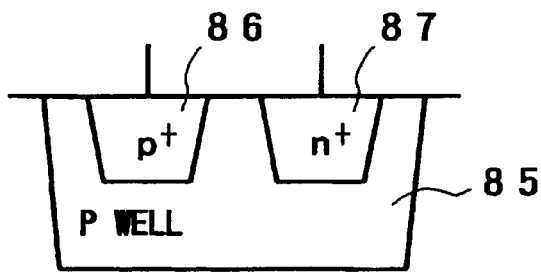
Figure 16:
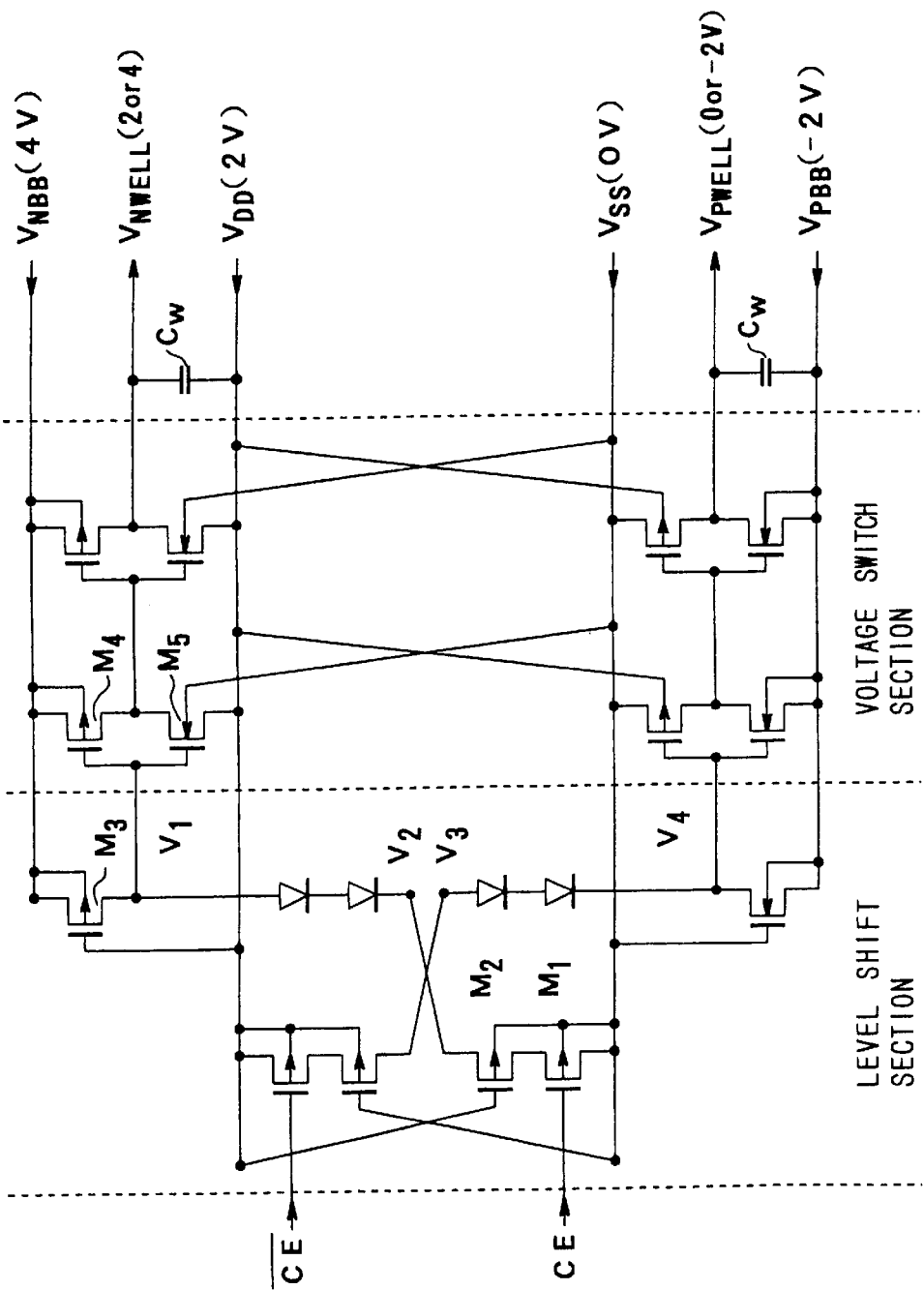
FIG. 16 is a circuit diagram showing a prior art threshold value controlling circuit.

Further, as shown in FIG. 15B, it is also possible to form a diode element in an n+ layer 83 and a p+ layer 84 both formed in an N well 82, respectively. Further, as shown in FIG. 15C, it is also possible to form a diode element in a p+ layer 86 and an n+ layer 87 both formed in a P well 85, respectively.

Tenth Embodiment

Figure 19:
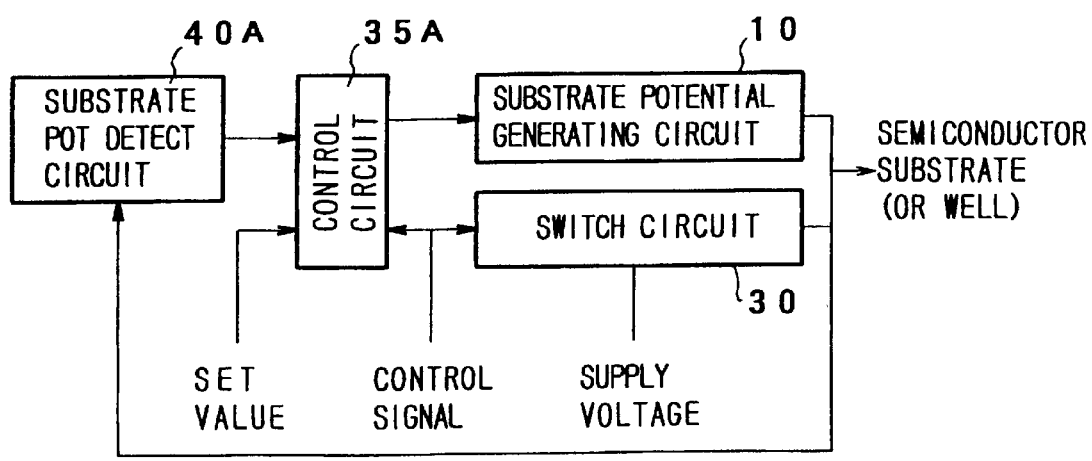
FIG. 19 is a block diagram showing a tenth embodiment of the semiconductor integrated circuit device according to the present invention.

FIG. 19 shows the tenth embodiment of the semiconductor integrated circuit device according to the present invention. In the semiconductor integrated circuit device shown in FIG. 19, the control circuit 35 and the substrate potential detecting circuit 40 of the second embodiment shown in FIG. 4 are replaced with a control circuit 35A and a substrate potential detecting circuit 40A, respectively.

Further, the substrate potential detecting circuit 40A outputs a potential obtained by shifting the level of the substrate potential. FIG. 5 shows a practical circuit of the substrate potential detecting circuit 40A, which is constructed by connecting an n-units of PMOS transistors $41_1, \ldots, 4_n$ in series in such a way that each of these PMOS transistors is operative within the sub-threshold range.

Figure 20:
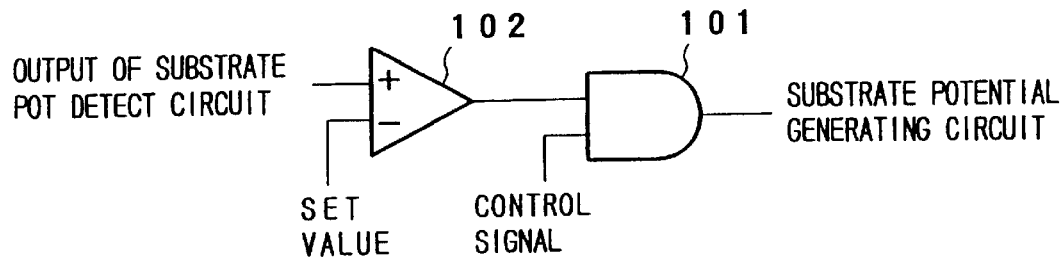
FIG. 20 is a circuit diagram showing a practical control circuit used for the tenth embodiment of the present invention.

To the control circuit 35A, a potential corresponding to a set value is inputted. FIG. 20 shows a practical circuit of the control circuit 35A, which is composed of a potential comparator 102 and an AND gate 101. The potential comparator 102 compares the detected substrate potential with the set value. The output of this potential comparator and the control signal are both inputted to the AND gate.

Therefore, the output of the potential comparator 102 corresponds to the output of the substrate potential detecting circuit 40 of the second embodiment, and the operation of this embodiment is basically the same as with the case of the second embodiment.

In this tenth embodiment, it is of course possible to obtain the same effect as with the case of the second embodiment.

Eleventh Embodiment

Figure 21:
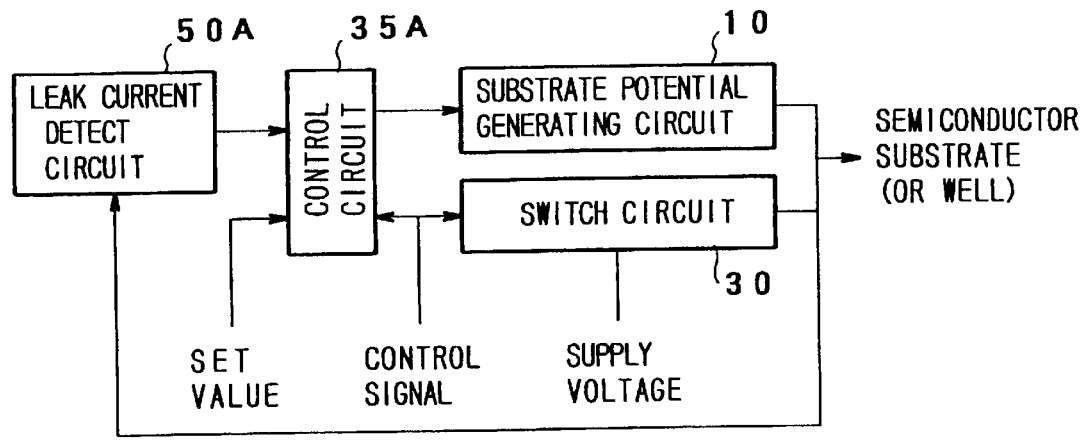
FIG. 21 is a block diagram showing an eleventh embodiment of the semiconductor integrated circuit device according to the present invention.

FIG. 21 shows the eleventh embodiment of the semiconductor integrated circuit device according to the present invention. In the semiconductor integrated circuit device shown in FIG. 21, the control circuit 35 and the leak current detecting circuit 50 of the third embodiment shown in FIG. 7 are replaced with a control circuit 35A and a leak current detecting circuit 50A, respectively.

The leak current detecting circuit 50A outputs a potential corresponding to the leak current. The practical circuit construction is the same as with the case of the third embodiment as shown in FIG. 8.

Figure 22:
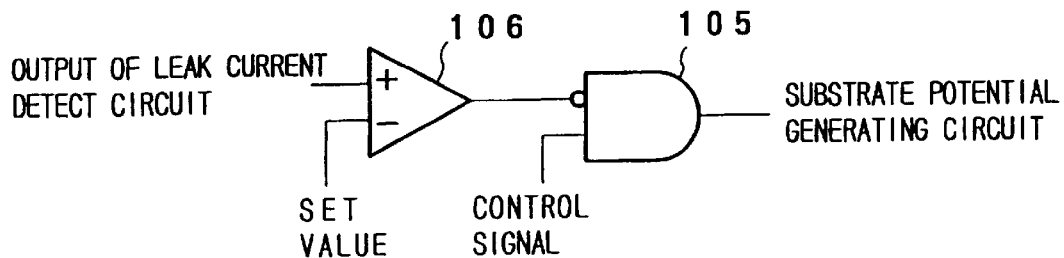
FIG. 22 is a circuit diagram showing a practical control circuit used for the eleventh embodiment of the present invention.

To the control circuit 35A, a potential corresponding to a set value is inputted. FIG. 22 shows a practical circuit of the control circuit 35A, which is composed of a potential comparator 106 and an AND gate 105. The potential comparator 106 compares the potential corresponding to the detected leak current with the set value. The inversion output of this potential comparator 106 and the control signal are both inputted to the AND gate 105.

Therefore, the output of the potential comparator 106 corresponds to the output of the leak current detecting circuit 50 of the third embodiment, and the operation of this embodiment is basically the same as with the case of the third embodiment.

In this eleventh embodiment, it is of course possible to obtain the same effect as with the case of the third embodiment.

As described above, in the semiconductor integrated circuit device according to the present invention, it is possible to control the threshold value thereof, without adding any new supply voltages to the drive supply voltage $V_{DD}$ and the ground supply voltage GND.

What is claimed is:

1. A semiconductor integrated circuit device, comprising:
   a substrate potential detecting circuit for detecting a potential of a semiconductor substrate;
   a substrate potential generating circuit operative on the basis of a control signal, for deepening a substrate bias of the semiconductor substrate when activated;
   a switch circuit turned on when said substrate potential generating circuit is deactivated, to connect the semiconductor substrate to a supply voltage, but turned off when said substrate potential generating circuit is activated; and
   a control circuit for driving said substrate potential generating circuit and said switch circuit on the basis of the control signal, and a value detected by said substrate potential detecting circuit to control the potential of the semiconductor substrate to a predetermined value or a potential of the supply voltage.

2. The semiconductor integrated circuit device of claim 1, wherein the substrate potential generating circuit comprises an oscillator circuit operative on the basis of the control signal, the oscillator circuit being stopped when the substrate potential generating circuit is deactivated.

3. The semiconductor integrated circuit device of claim 1, wherein the switch circuit comprises:
   a first MOSFET with a conductivity type different from the conductivity type of the semiconductor substrate having a drain terminal to which the supply potential is applied and a source terminal connected to the semiconductor substrate;
   a second MOSFET with the same conductivity type as the semiconductor substrate having a drain terminal connected to a gate terminal of said first MOSFET, a source terminal to which a second supply potential different from the supply potential is applied, and a gate terminal to which the control signal is applied, and turned on when the switch circuit is activated;
   a pump circuit having an output terminal connected to the gate terminal of the first MOSFET and being activated when the switch circuit is deactivated.

4. The semiconductor integrated circuit device of claim 3, which further comprises a third MOSFET with the same conductivity type as the semiconductor substrate, having a gate terminal to which the supply potential is applied, and connected between the drain terminal of the second MOSFET and the gate terminal of the first MOSFET.

5. The semiconductor integrated circuit device of claim 3, which further comprises first and second rectifying circuits connected between the gate and source terminals of the first MOSFET in such a way that polarity thereof is inverse parallel to each other.

6. The semiconductor integrated circuit device of claim 5, which further comprises a third MOSFET with the same conductivity type as the semiconductor substrate, having a gate terminal to which the supply potential is applied, and connected between the drain terminal of the second MOSFET and the gate terminal of the first MOSFET.

7. The semiconductor integrated circuit device of claim 5, which further comprises a MOSFET with a conductivity type different from the conductivity type of the semiconductor substrate, having a gate terminal to which the supply potential is applied, and connected between the source terminal of the first MOSFET and an output terminal of one of said two rectifying circuits, for passing current from the gate terminal to the source terminal of the first MOSFET.

8. The semiconductor integrated circuit device of claim 5, wherein the pump circuit pumps out carriers with the same conductivity type as the semiconductor substrate when activated, but stops when the switch circuit is activated.

9. A semiconductor integrated circuit device, comprising:
   a leak current detecting circuit for detecting leak current of a transistor formed on a semiconductor substrate;
   a substrate potential generating circuit operative on the basis of a control signal, for deepening a substrate bias of the semiconductor substrate when activated;
   a switch circuit turned on when said substrate potential generating circuit is deactivated, to connect the semiconductor substrate to a supply voltage, but turned off when said substrate potential generating circuit is activated; and
   a control circuit for driving said substrate potential generating circuit and said switch circuit on the basis of the control signal and a value detected by said leak current detecting circuit to control the potential of the semiconductor substrate to a predetermined value or a potential of the supply voltage.

10. The semiconductor integrated circuit device of claim 9, wherein the substrate potential generating circuit comprises an oscillator circuit operative on the basis of the control signal, the oscillator circuit being stopped when the substrate potential generating circuit is deactivated.

11. The semiconductor integrated circuit device of the claim 9, wherein the switch circuit comprises:
   a first MOSFET with a conductivity type different from the conductivity type of the semiconductor substrate having a drain terminal to which the supply potential is applied and a source terminal connected to the semiconductor substrate;
   a second MOSFET with the same conductivity type as the semiconductor substrate having a drain terminal connected to a gate terminal of said first MOSFET, a source terminal to which a second supply potential different from the supply potential is applied, and a gate terminal to which the control signal is applied, and turned on when the switch circuit is activated;
   a pump circuit having an output terminal connected to the gate terminal of the first MOSFET and being activated when the switch circuit is deactivated.

12. The semiconductor integrated circuit device of claim 11, which further comprises a third MOSFET with the same conductivity type as the semiconductor substrate, having a gate terminal to which the supply potential is applied, and connected between the drain terminal of the second MOSFET and the gate terminal of the first MOSFET.

13. The semiconductor integrated circuit device of claim 11, which further comprises first and second rectifying circuits connected between the gate and source terminals of the first MOSFET in such a way that polarity thereof is inverse parallel to each other.

14. The semiconductor integrated circuit device of claim 13, which further comprises a third MOSFET with the same conductivity type as the semiconductor substrate, having a gate terminal to which the supply potential is applied, and connected between the drain terminal of the second MOSFET and the gate terminal of the first MOSFET.

15. The semiconductor integrated circuit device of claim 13, which further comprises a MOSFET with a conductivity type different from the conductivity type of the semiconductor substrate, having a gate terminal to which the supply potential is applied, and connected between the source terminal of the first MOSFET and an output terminal of one of said two rectifying circuit, for passing current from the gate terminal to the source terminal of the first MOSFET.

16. The semiconductor integrated circuit device of claim 13, wherein the pump circuit pumps out carriers with the same conductivity type as the semiconductor substrate when activated, but stops when the switch circuit is activated.

17. A semiconductor integrated circuit device, comprising:
   a first pump circuit having an output terminal connected to a first-conductivity type semiconductor substrate, for pumping out first-conductivity type carriers;
   a first MOSFET with a second-conductivity type different from the first-conductivity type having a source terminal connected to the output terminal of said first pump circuit and a drain terminal connected to a first supply voltage;
   a second pump circuit having an output terminal connected to a gate terminal of the first MOSFET, for pumping out first-conductivity type carriers; and
   a second MOSFET with the first-conductivity type having a source terminal connected to a second supply voltage, a gate terminal to which a control signal is applied, and a drain terminal connected to the gate terminal of said first MOSFET.

18. The semiconductor integrated circuit device of claim 17, which further comprises first and second rectifying circuits connected between the gate and source terminals of said first MOSFET in such a way that polarity thereof is inverse parallel to each other.

19. The semiconductor integrated circuit device of claim 18, which further comprises a third MOSFET with the first-conductivity type having a gate terminal connected to the first supply voltage and connected between the drain terminal of said second MOSFET and the gate terminal of said first MOSFET.

20. The semiconductor integrated circuit device of claim 18, which further comprises a MOSFET with the second-conductivity type having a gate terminal connected to the first supply voltage, and connected between the source terminal of said first MOSFET and an output terminal of one of said two rectifying circuits, for passing current from the gate terminal to the source terminal of said first MOSFET.

21. The semiconductor integrated circuit device of claim 17, which further comprises a third MOSFET with the same conductivity type as the semiconductor substrate, having a gate terminal to which the first supply voltage is applied, and connected between the drain terminal of said second MOSFET and the gate terminal of said first MOSFET.

22. A semiconductor integrated circuit device, comprising:
   a substrate potential generating circuit operative on the basis of a control signal, for deepening a substrate bias of a semiconductor substrate when activated; and
   a switch circuit operative on the basis of the control signal and turned on when said substrate potential generating circuit is deactivated, to set a potential of the semiconductor substrate to a supply potential, but turned off when said substrate potential generating circuit is activated,
   wherein the substrate potential generating circuit comprises an oscillator circuit operative on the basis of the control signal, the oscillator circuit being stopped when said substrate potential generating circuit is deactivated.

23. A semiconductor integrated circuit device, comprising:
   a substrate potential generating circuit operative on the basis of a control signal, for deepening a substrate bias of a semiconductor substrate when activated; and a switch circuit operative on the basis of the control signal and turned on when said substrate potential generating circuit is deactivated, to set a potential of the semiconductor substrate to a supply potential, but turned off when said substrate potential generating circuit is activated, wherein the switch circuit comprises:

a first MOSFET with a conductivity type different from the conductivity type of the semiconductor substrate, having a drain terminal to which the supply potential is applied and a source terminal connected to the semiconductor substrate;

a second MOSFET with the same conductivity type as the semiconductor substrate, having a drain terminal connected to a gate terminal of said first MOSFET, a source terminal to which a second supply potential different from the supply potential is applied, and a gate terminal to which the control signal is applied, and turned on when the switch circuit is activated; and a pump circuit having an output terminal connected to the gate terminal of the first MOSFET and being activated when the switch circuit is deactivated.

24. The semiconductor integrated circuit device of claim 23, which further comprises a third MOSFET with the same conductivity type as the semiconductor substrate, having a gate terminal to which the supply potential is applied, and connected between the drain terminal of the second MOSFET and the gate terminal of the first MOSFET.

25. The semiconductor integrated circuit device of claim 23, which further comprises first and second rectifying circuits connected between the gate and source terminals of the first MOSFET in such a way that polarity thereof is inverse parallel to each other.

26. The semiconductor integrated circuit device of claim 25, which further comprises a third MOSFET with the same conductivity type as the semiconductor substrate, having a gate terminal to which the supply potential is applied, and connected between the drain terminal of the second MOSFET and the gate terminal of the first MOSFET.

27. The semiconductor integrated circuit device of claim 25, which further comprises a MOSFET with a conductivity type different from the conductivity type of the semiconductor substrate, having a gate terminal to which the supply potential is applied, and connected between the source terminal of the first MOSFET and an output terminal of one of the two rectifying circuits, for passing current from the gate terminal to the source terminal of the first MOSFET.

28. The semiconductor integrated circuit device of claim 25, wherein the pump circuit pumps out carriers with the same conductivity type as the semiconductor substrate when activated, but stops when the switch circuit is activated.

* * * * *